No. 683,465. Patented Oct. 1, 1901.
J. T. HICKS.
CASHIER'S FILE BOX.
(Application filed Dec. 19, 1900.)
(No Model.)
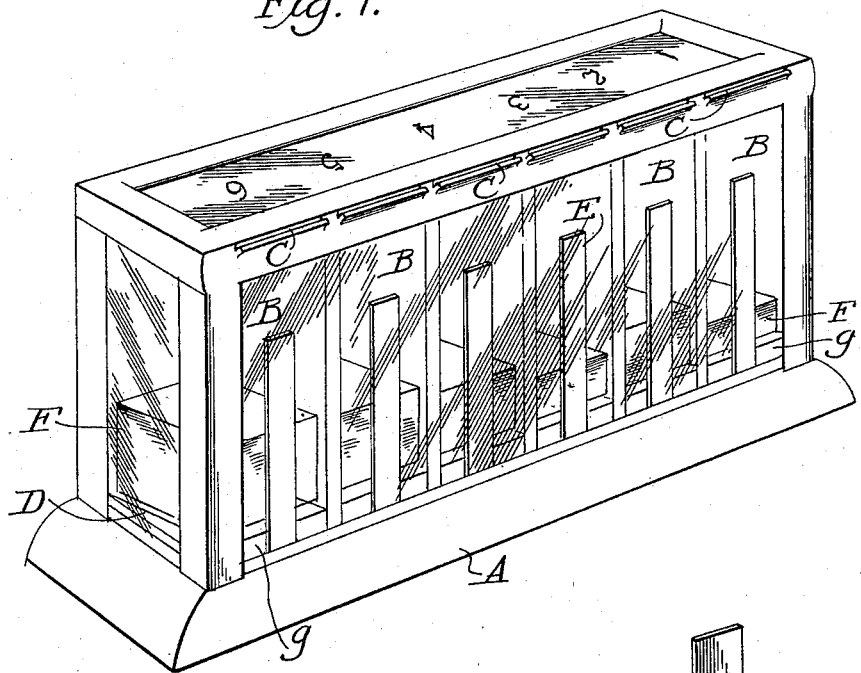
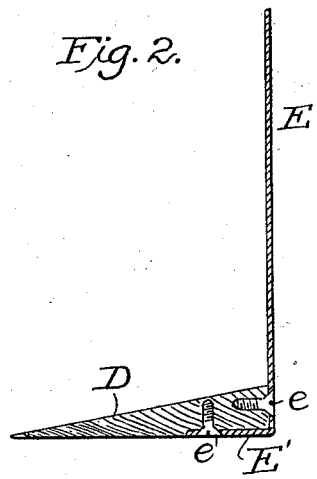
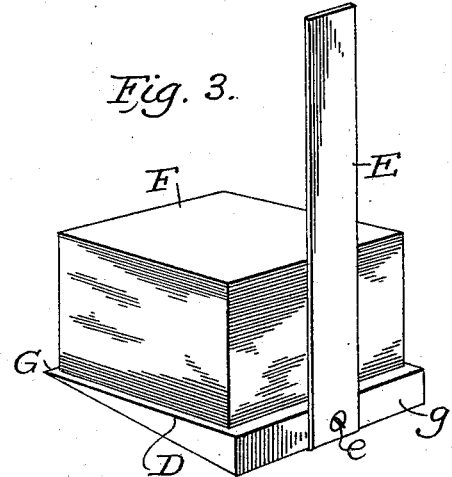
WITNESSES
INVENTOR

UNITED STATES PATENT OFFICE.

JOHN TYLER HICKS, OF BOSTON, MASSACHUSETTS.

CASHIER'S FILE-BOX.

SPECIFICATION forming part of Letters Patent No. 683,465, dated October 1, 1901.

Application filed December 19, 1900. Serial No. 40,466. (No model.)

*To all whom it may concern:*

Be it known that I, JOHN TYLER HICKS, a citizen of the United States of America, and a resident of Boston, county of Suffolk, State of Massachusetts, have invented certain new and useful Improvements in Cashiers' File-Boxes, of which the following is a specification.

This invention relates to a check-containing box or receptacle adapted and intended to be used by a cashier or treasurer of a hotel, restaurant, or other concern which employs the checking system known as the "Hicks method of cash registering and account checking," said system being covered by United States Letters Patent No. 500,071, dated June 20, 1893.

The specific improvement to which this present invention relates is a removable shelf or bottom to be used in the several compartments of the cashier's file-box described and claimed in my former Letters Patent No. 630,505, dated August 8, 1899. The file-box described in said patent comprises a supporting-base, a series of compartments, one of which is assigned to the checks of each waiter, each compartment being provided with a slot having an inclined lip and locking means for keeping the compartments securely locked against unauthorized entry, the entire arrangement providing a labor-saving device whereby the auditor when he comes to examine the checks will find them arranged in order both as to the different waiters and as to the consecutiveness of the series of checks belonging to each waiter, and the large amount of labor ordinarily attending the manipulation of the checks to find out whether one is missing is avoided, in addition to the extremely valuable protection which a file-box of this character affords to the proprietor in that a cashier or bar-tender or other salesman is effectually prevented from working deadwood checks.

The invention therefore consists, essentially, in the removable or secondary bottom or shelf designed to be placed in each one of the file-box compartments, so that the checks as they are dropped into the file-box may be arranged in piles upon said removable bottom, and also in numerous details and peculiarities in the arrangement and application of said removable device, to the end that the work of auditing the checks may be expedited and still more easily carried on than has been possible heretofore, all substantially as will be hereinafter more fully described, and pointed out in the ensuing clauses of the claim.

In the accompanying drawings, illustrating my invention, Figure 1 is a perspective view of my improved check-file. Fig. 2 is a cross-section of the removable shelf or bottom and its handle. Fig. 3 is a perspective view of the same device, showing a group of checks thereon.

Similar letters of reference designate corresponding parts throughout all the different figures of the drawings.

The file-box proper is, as I have above intimated, constructed after the manner of the box shown and described in my Letters Patent No. 630,505, to which I have already alluded, in so far as the main frame of the box is concerned, for it consists of the base-board A, on which is superposed a framework that furnishes the compartments B B B of the box, each compartment having an entry-slot C cut through the top, through which slot the checks are introduced into the compartment. The sides, top, and ends of the box are preferably made of glass or other transparent material in order that the contents of the several compartments may be in view at all times.

From a consideration of the construction and use of the box as I have just briefly described it and as it is set forth in my said Letters Patent No. 630,505 it will be understood that when a check is introduced through the slot C it cannot occupy at any time a vertical position, but must pursue an inclined direction, which will cause it to fly first against the opposite wall of the compartment, and in its rebound it will be impossible for it to reverse its position, but will be obliged to fall so as to lie on the top of the pile, with its face upward, in such a position that its consecutive number, as well as its other imprinted matter, may be visible to any one looking through the glass wall of the box. In the box described in my former patent the checks become piled in groups in the several compartments upon the floor of the box, and in removing them from the compartments after the box is unlocked it is necessary to gather up all the checks of each group and withdraw them from the compartments, which action is often attended with some inconvenience and certain disadvantages, growing out of the fact that as the compartment is not much larger in size than the check there is not much room to introduce the hand into the compartment, and also in thus handling a pile of checks some of the bottom ones are apt to be left on the floor of the compartment, thus necessitating a second handling, and consequently it is the aim and purpose of the present invention to provide an auxiliary or supplemental shelf or bottom for each compartment on which the checks may fall in like manner as they would fall upon the original primary bottom of the compartments, said secondary bottom being easily removable by means of a handle that can be conveniently grasped by the auditor or other user of the device, and when the bottom is thus taken out of the compartment it will carry with it the entire group of checks supported thereon, and thus the withdrawal of all the checks in any one compartment is quickly and satisfactorily accomplished by a single deft movement of the hand in manipulating the secondary bottom.

In Figs. 2 and 3 I have represented in detail the construction of the special shelf or bottom which I am now describing and which constitutes my present improvement. D denotes one of said shelves or bottoms. It is of proper size to adapt it to fit neatly into the compartment B and to rest on the floor of said compartment. It is preferably provided with an inclined upper face, one edge being thin, as at G, and the other having some little thickness, as at $g$, the thicker edge of the part D being located at the rear of the compartment B, or, in other words, at that edge which is directly underneath the slot C. The object of the upper inclined face of the part D is to permit the checks to fall more easily thereon and to more effectually prevent any possibility of their becoming reversed in position during the drop from the slot C. On the removable bottom D as it is shown in Fig. 3 appears a pile of checks F, arranged in the position in which they naturally fall as they are dropped through the slots in the top of the compartments. The rear or thicker edge $g$ of the bottom D is provided with a vertical handle E, which is secured centrally to the edge $g$ by means of a screw $e$, and the lower end of which handle may be bent at E' and secured by another screw $e$ to the under side of the supplemental bottom D. Of course I suggest this construction simply by way of example. The handle E may be varied as to its form and connection with the bottom within wide limits. The handle and bottom may be made integral with each other, if desired, and of wood, metal, or any other suitable material. Thus it will be seen that when it is desired to remove the checks from the several compartments of the file-box it is only necessary to lay hold of the handles E one after another and lift the bottoms D out of the several compartments, carrying with them the superposed piles of checks, which can afterward be easily slipped off the bottoms D without any danger of commingling or disarrangement, and consequently by the use of these removable bottoms all the trouble incident to the removal of the groups of checks are effectually obviated.

Having thus described my invention, what I claim as new, and desire to secure by Letters Patent, is—

1. The combination with a cashier's file-box, consisting of a series of compartments one of which is assigned to the checks of each waiter, of a supplemental and removable bottom for each compartment, said bottom having an inclined upper face.

2. The combination with a cashier's file-box, having a series of compartments one of which is assigned to the checks of each waiter, of a supplemental bottom for each compartment, said bottom having a beveled upper face and also provided with a handle.

Signed at New York this 26th day of October, 1900.

JOHN TYLER HICKS.

Witnesses:
   T. ALLSTON BROWN,
   FRED E. TASKER.